US012394924B2

(12) United States Patent
Meng et al.

(10) Patent No.: US 12,394,924 B2
(45) Date of Patent: Aug. 19, 2025

(54) BOARD-TO-BOARD CONNECTOR ASSEMBLY WITH METAL MEMBERS ALLOWING LARGER CURRENT TRANSMISSION

(71) Applicant: Advanced Connectek Inc., New Taipei (TW)

(72) Inventors: Ta-Teh Meng, New Taipei (TW); Mei Shi, New Taipei (TW); Ya-Ping Liang, New Taipei (TW); Ping Shi, New Taipei (TW); Meng Liu, New Taipei (TW); Man Ge, New Taipei (TW); Hao Xie, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 357 days.

(21) Appl. No.: 17/852,373

(22) Filed: Jun. 29, 2022

(65) Prior Publication Data

US 2022/0416455 A1 Dec. 29, 2022

(30) Foreign Application Priority Data

Jun. 29, 2021 (CN) ......................... 202110728194.7

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7064* (2013.01); *H01R 12/71* (2013.01); *H01R 13/02* (2013.01); *H01R 13/40* (2013.01); *H01R 13/422* (2013.01); *H01R 13/4223* (2013.01); *H01R 13/4226* (2013.01); *H01R 12/51* (2013.01);
(Continued)

(58) Field of Classification Search
CPC .. H01R 12/716; H01R 12/7064; H01R 12/71; H01R 13/02; H01R 13/40; H01R 13/422; H01R 13/4223; H01R 13/4226; H01R 12/51; H01R 12/52; H01R 12/70;
(Continued)

(56) References Cited

U.S. PATENT DOCUMENTS

2019/0363467 A1* 11/2019 Ko ......................... H01R 13/26
2020/0343660 A1* 10/2020 Gondo ................... H01R 12/71
2021/0143567 A1* 5/2021 Someya ............... H01R 13/504

FOREIGN PATENT DOCUMENTS

CN 104733897 A * 6/2015

* cited by examiner

*Primary Examiner* — Justin M Kratt
(74) *Attorney, Agent, or Firm* — JCIPRNET

(57) ABSTRACT

A board-to-board connector assembly includes a receptacle connector and a plug connector mated with each other. The receptacle connector includes a first body, first terminals and a pair of first metal members. The first body includes an island structure and a first receiving slot surrounding the island structure. The first terminals are respectively disposed on a first side and a second side of the first receiving slot, the first and second sides being opposite to each other. The first metal members are respectively disposed on a third side and a fourth side of the first receiving slot, the third and fourth sides being opposite to each other. The first metal member includes a base extending to a bottom on the third side or a bottom on the fourth side, and a pair of first elastic arms extending from the base and facing away from each other.

18 Claims, 7 Drawing Sheets

(51) Int. Cl.

| | |
|---|---|
| ***H01R 13/02*** | (2006.01) |
| ***H01R 13/40*** | (2006.01) |
| ***H01R 13/422*** | (2006.01) |
| *H01R 12/51* | (2011.01) |
| *H01R 12/52* | (2011.01) |
| *H01R 12/73* | (2011.01) |
| *H01R 13/53* | (2006.01) |
| *H01R 24/00* | (2011.01) |

(52) U.S. Cl.
CPC .............. *H01R 12/52* (2013.01); *H01R 12/70* (2013.01); *H01R 12/7005* (2013.01); *H01R 12/707* (2013.01); *H01R 12/712* (2013.01); *H01R 12/73* (2013.01); *H01R 13/53* (2013.01); *H01R 24/00* (2013.01)

(58) Field of Classification Search
CPC ......................... H01R 12/7005; H01R 12/707; H01R 12/712; H01R 12/73; H01R 13/53; H01R 24/00
See application file for complete search history.

BOARD-TO-BOARD CONNECTOR ASSEMBLY WITH METAL MEMBERS ALLOWING LARGER CURRENT TRANSMISSION

CROSS-REFERENCE TO RELATED APPLICATION

This application claims the priority benefit of China application serial no. 202110728194.7, filed on Jun. 29, 2021. The entirety of the above-mentioned patent application is hereby incorporated by reference herein and made a part of this specification.

BACKGROUND

Technical Field

The disclosure relates to a connector assembly, and more particularly, to a board-to-board connector assembly.

Description of Related Art

A board-to-board connector is used to connect different circuit boards, and has a receptacle connector and a plug connector to be respectively mounted on different circuit boards, thereby connecting the circuit boards to each other. In mobile devices such as smartphones, the board-to-board connector assembly is very small in size, which reduces the structural strength and lifespan of each connector.

Furthermore, the above-mentioned reduction in structural strength is also reflected in the plugging and unplugging operations of the male terminal (plug) and the female terminal (receptacle); that is, part of the structure is damaged due to structural interference during the process of pulling the male terminal and the female terminal away from each other due to the reduction in strength or terminal elasticity.

Accordingly, how to improve the structural strength of the board-to-board connector so as to maintain and withstand the plugging and unplugging actions of the male and female terminals is a problem that the people skilled in the art need to consider and solve.

SUMMARY

The disclosure provides a board-to-board connector assembly, including a receptacle connector and a plug connector mated with each other. The receptacle connector includes a first body, a plurality of first terminals and a pair of first metal members. The first body includes an island structure and a first receiving slot surrounding the island structure. The first terminals are respectively disposed on a first side and a second side of the first receiving slot, and the first side and the second side are opposite to each other. The first metal members are respectively disposed on a third side and a fourth side of the first receiving slot, and the third side and the fourth side are opposite to each other. The first metal member includes a base extending to a bottom on the third side or a bottom on the fourth side, and a pair of first elastic arms extending from the base and facing away from each other.

Preferably, the first elastic arms and a part of the first terminals are aligned collinearly.

Preferably, the first elastic arms are power terminals of the receptacle connector.

Preferably, the first metal member includes three saddles disposed on a periphery of the first body. The three saddles are adjacent to each other and disposed in a U shape. The saddle located in the middle extends out of the base. Each of the saddles contacts three different surfaces of the first body.

Preferably, the first metal member includes three saddles disposed on a periphery of the first body. The three saddles are adjacent to each other and disposed in a U shape. The first elastic arms respectively face an inward inclination of each of the saddles located at the first and last positions.

Preferably, the first metal member further includes a second elastic arm extending from the base to the island structure, and the second elastic arm is located between the first elastic arms.

Preferably, the first receiving slot is a through hole on the third side and the fourth side, and the base is exposed from a bottom surface of the first body through the through hole.

Preferably, the plug connector includes a second body, a plurality of second terminals, and a pair of second metal members. The second body includes a second receiving slot. The second terminals are respectively disposed on two opposite sides of the second body. The second metal members are disposed on another two opposite sides of the second body. When the plug connector is mated with the receptacle connector, the second body is inserted into the first receiving slot, and the island structure is inserted into the second receiving slot, and the first metal members abut the second metal members through the first elastic arms.

Preferably, the second metal members cover five different surfaces of the second body.

Preferably, the second metal member further includes a slope, so that when the plug connector is mated with the receptacle connector, the slope abuts and guides a second elastic arm of the first metal member.

Based on the above, the board-to-board connector assembly includes a plug connector and a receptacle connector that are mated with each other. In addition to being combined to opposite sides of the first body, the pair of first metal members of the receptacle connector further include the base extending to the bottom of the receiving slot of the first body and the first elastic arms extending from the base and facing away from each other. Accordingly, the first elastic arm can further serve as a structure for electrical connection with the plug connector, so as to improve the electrical contact area between components of the board-to-board connector assembly, which is adapted to carry out a larger current transmission operation with better structural stability.

To make the aforementioned more comprehensible, several embodiments accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
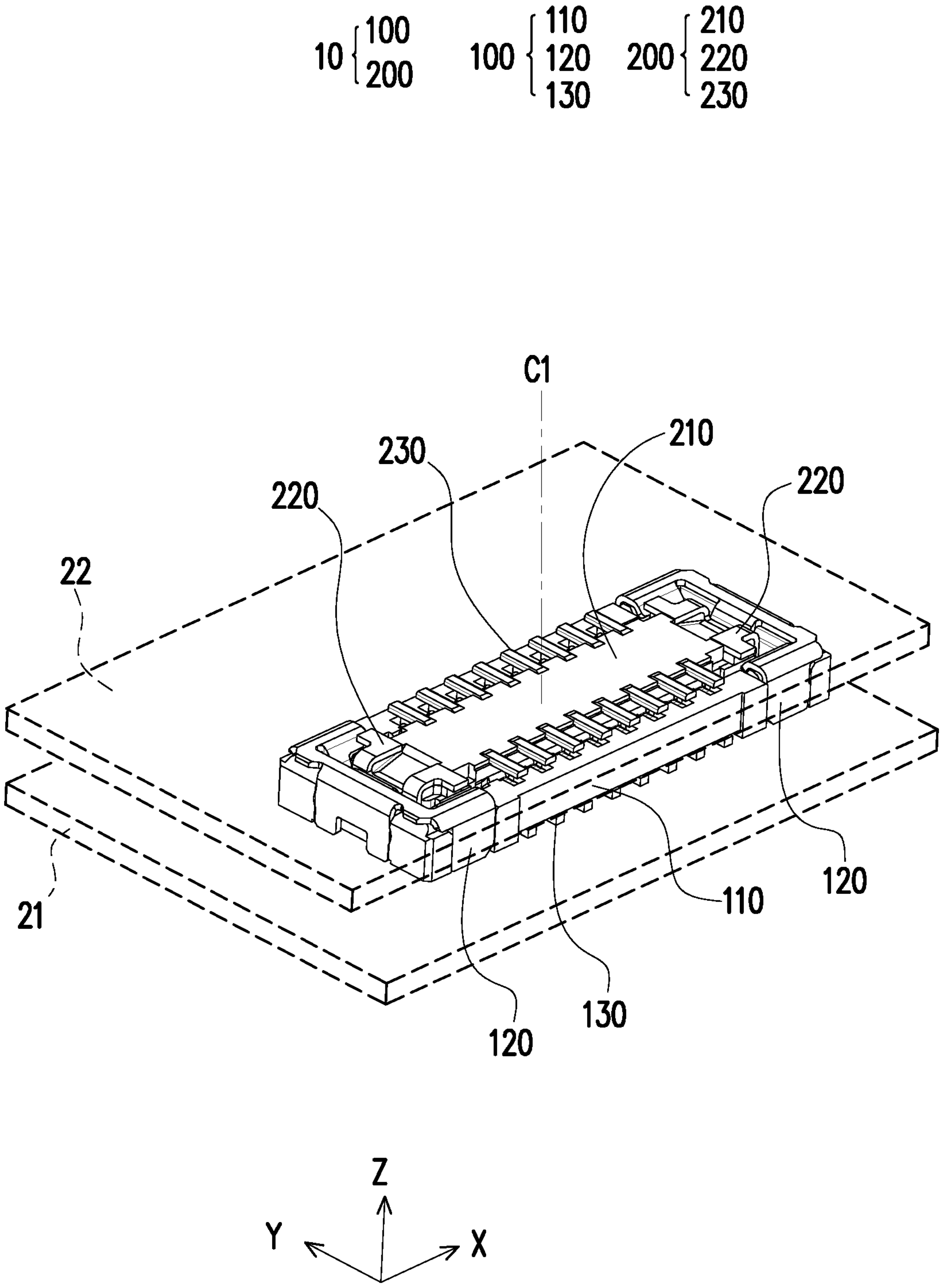
FIG. 1 is a schematic view of a board-to-board connector assembly according to an embodiment of the disclosure.
Figure 2:
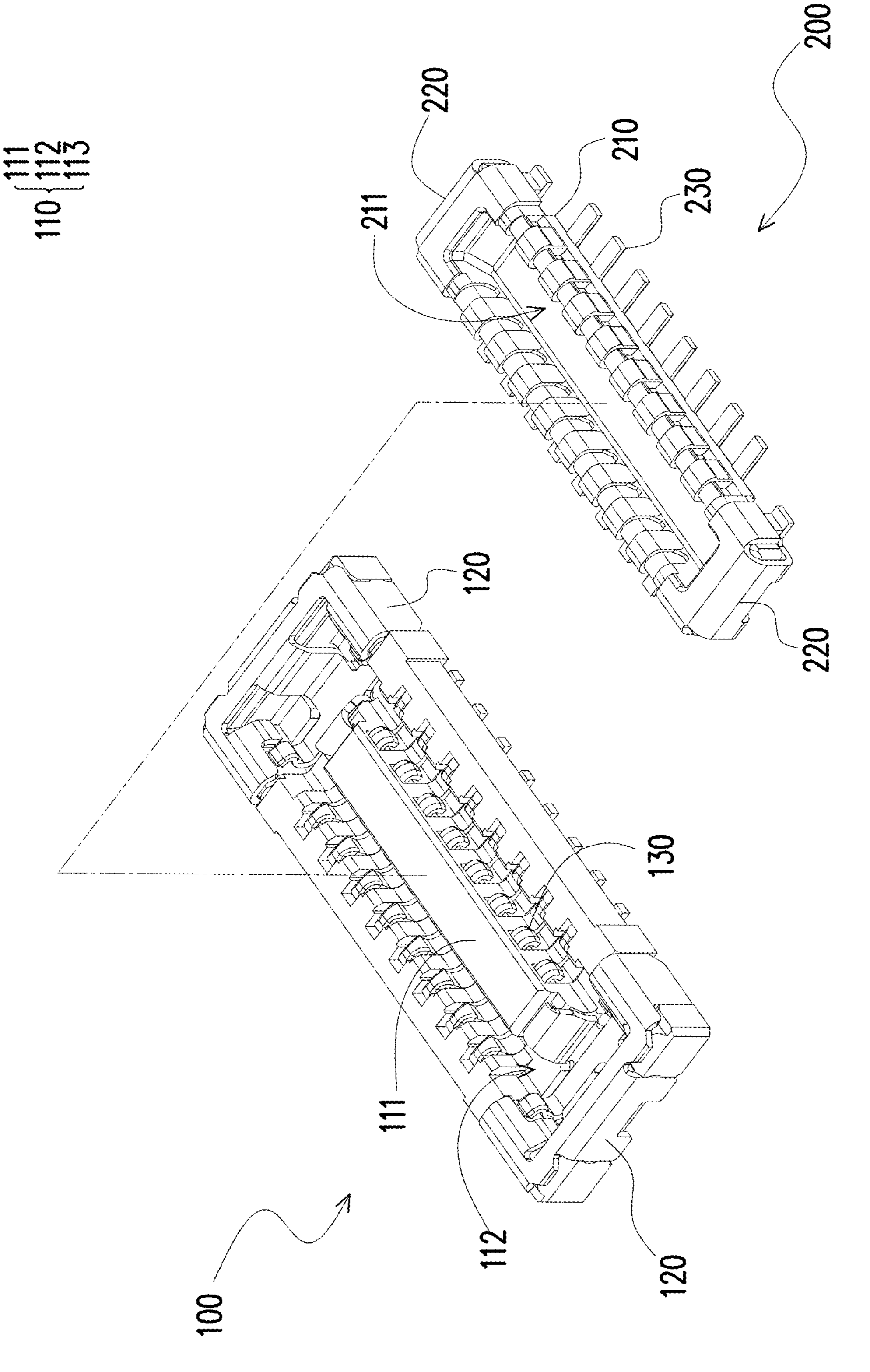
FIG. 2 is an exploded view of the board-to-board connector assembly of FIG. 1.

FIG. 1 is a schematic view of a board-to-board connector assembly according to an embodiment of the disclosure. FIG. 2 is an exploded view of the board-to-board connector assembly of FIG. 1. Please refer to FIG. 1 and FIG. 2 at the same time. In this embodiment, the board-to-board connector assembly 10 includes a receptacle connector 100 and a plug connector 200 that may be mated with each other. The receptacle connector 100 is disposed on a circuit board 21, for example, and the plug connector 200 is disposed on a circuit board 22, for example, so that when the receptacle connector 100 is mated with the plug connector 200, the circuit boards 21 and 22 may be electrically connected to each other.

Figure 3:
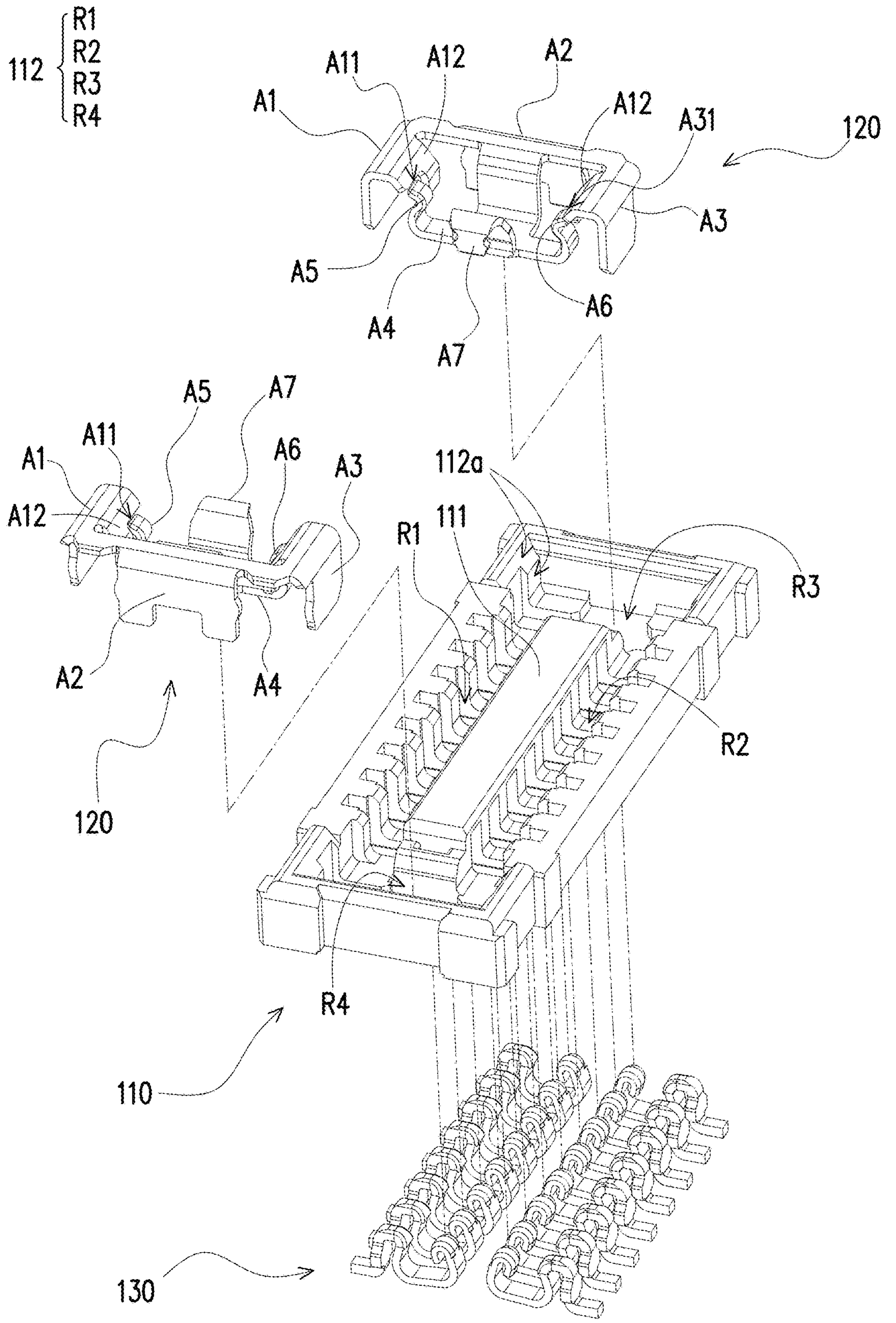
FIG. 3 is an exploded view of the receptacle connector of FIG. 2.

FIG. 3 is an exploded view of the receptacle connector of FIG. 2. Please refer to FIG. 2 and FIG. 3 at the same time. The receptacle connector 100 of this embodiment includes a first body 110, a plurality of first terminals 130 and a pair of first metal members 120. The first body 110 has an island structure 111 and a first receiving slot 112 surrounding the island structure 111. The first terminals 130 are respectively disposed on a first side R1 and a second side R2 of the first receiving slot 112, which are opposite to each other. The first metal members 120 are respectively disposed on a third side R3 and a fourth side R4 of the first receiving slot 112, which are opposite to each other. Furthermore, the first metal member 120 has a base A4 extending to the bottom of the third side R3 or the bottom of the fourth side R4, and a pair of first elastic arms A5 and A6 extending from the base A4 and facing away from each other.

In more detail, as shown in FIG. 3, the first metal member 120 includes three saddles A1, A2 and A3 disposed on the periphery of the first body 110, and the saddles A1 to A3 are adjacent to each other and disposed in a U shape and straddle the first receiving slot 112, so that the saddles A1 to A3 contact three different surfaces of the first body 110. Taking the saddle A3 shown in FIG. 3 as an example, the saddle A3 contacts the right side surface and the top surface of the first body 110, and the inner surface of the first receiving slot 112. Each of the first metal members 120 has a pair of protruding pieces A12 respectively located between a corner of the U shape and one of the first elastic arms A5, A6, extending from the saddles at a first position (i.e. the saddle A1) and at a last position (i.e. the saddle A3) toward the first receiving slot 112, and abutting against an inner wall 112*a* of the first receiving slot 112.

Figure 4:
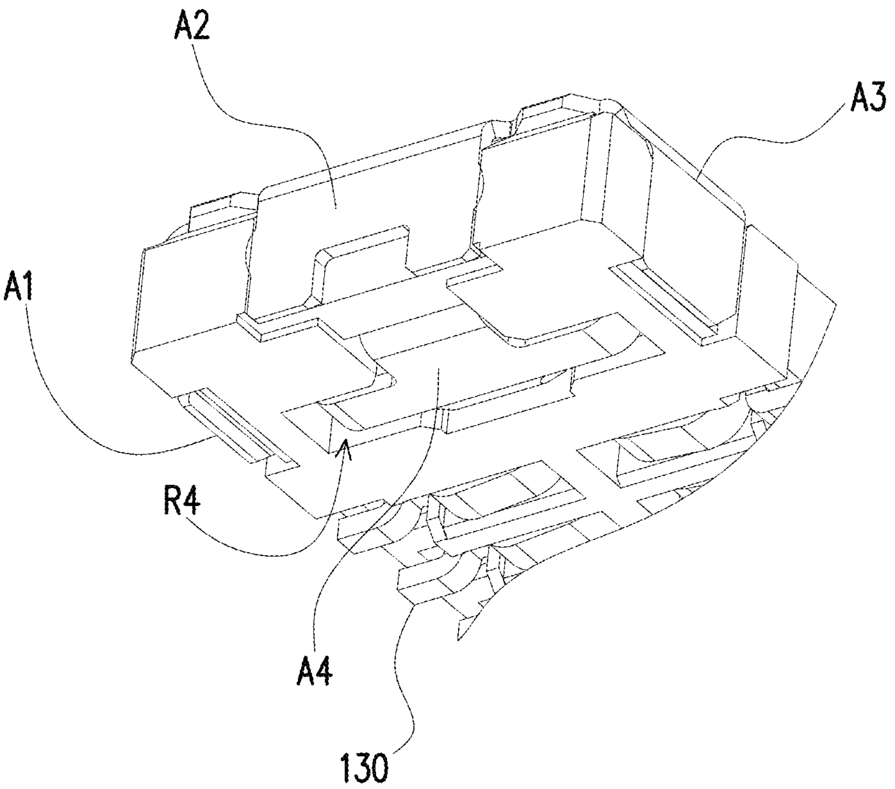
FIG. 4 is a partial schematic view of the receptacle connector of FIG. 2 from another perspective.

FIG. 4 is a partial schematic view of the receptacle connector of FIG. 2 from another perspective. Please refer to FIG. 3 and FIG. 4 at the same time. In addition, the saddle A2 in the middle further extends out of the base A4, and the first receiving slot 112 is a through hole on the third side R3 and the fourth side R4, so that the base A4 of the first metal member 120 is exposed from the bottom surface of the first body 110 through the through hole (the fourth side R4 is taken as an example in FIG. 4).

It should be noted that the first terminals 130 in this embodiment are disposed on the first body 110 in two rows, and the first elastic arms A5 and A6 of the first metal members 120 are respectively aligned collinearly with a part of the first terminals 130. Therefore, the four first elastic arms A5 and A6 of the two first metal members 120 are also disposed in the same two rows as the above. Accordingly, the first elastic arms A5 and A6 of the embodiment are used as power terminals of the receptacle connector 100, and since the first metal member 120 has a larger volume and surface area than the first terminal 130, it is more adapted to transmit a large current.

In addition, the first body 110 is electrically insulating, and the first terminals 130 and the first metal members 120 can be formed integrally with the first body 110 by insert molding. For the first body 110 and the first metal members 120, in addition to improving the bonding strength by the saddles A1 to A3 contacting the three different surfaces of the first body 110, the first metal members 120 also has the base A4 extending to the bottom of the first receiving slot 112 and the first elastic arms A5 and A6 extending from the base A4. Therefore, a larger contact area can be provided when the first elastic arms A5 and A6 are used as the power terminals of the connector, thereby making the receptacle connector 100 suitable for transmitting a larger current.

Figure 5:
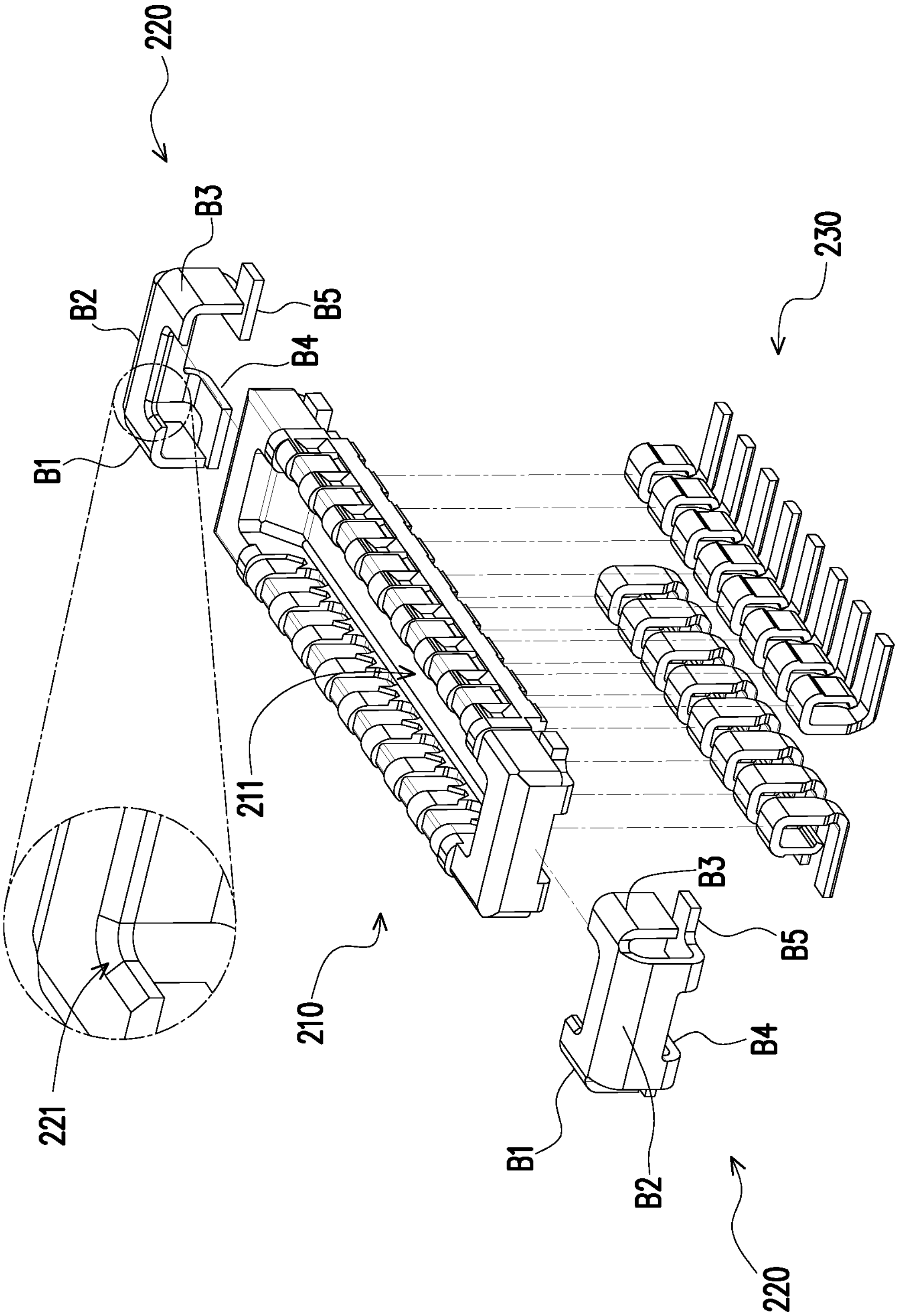
FIG. 5 is an exploded view of the plug connector of FIG. 2.
Figure 6:
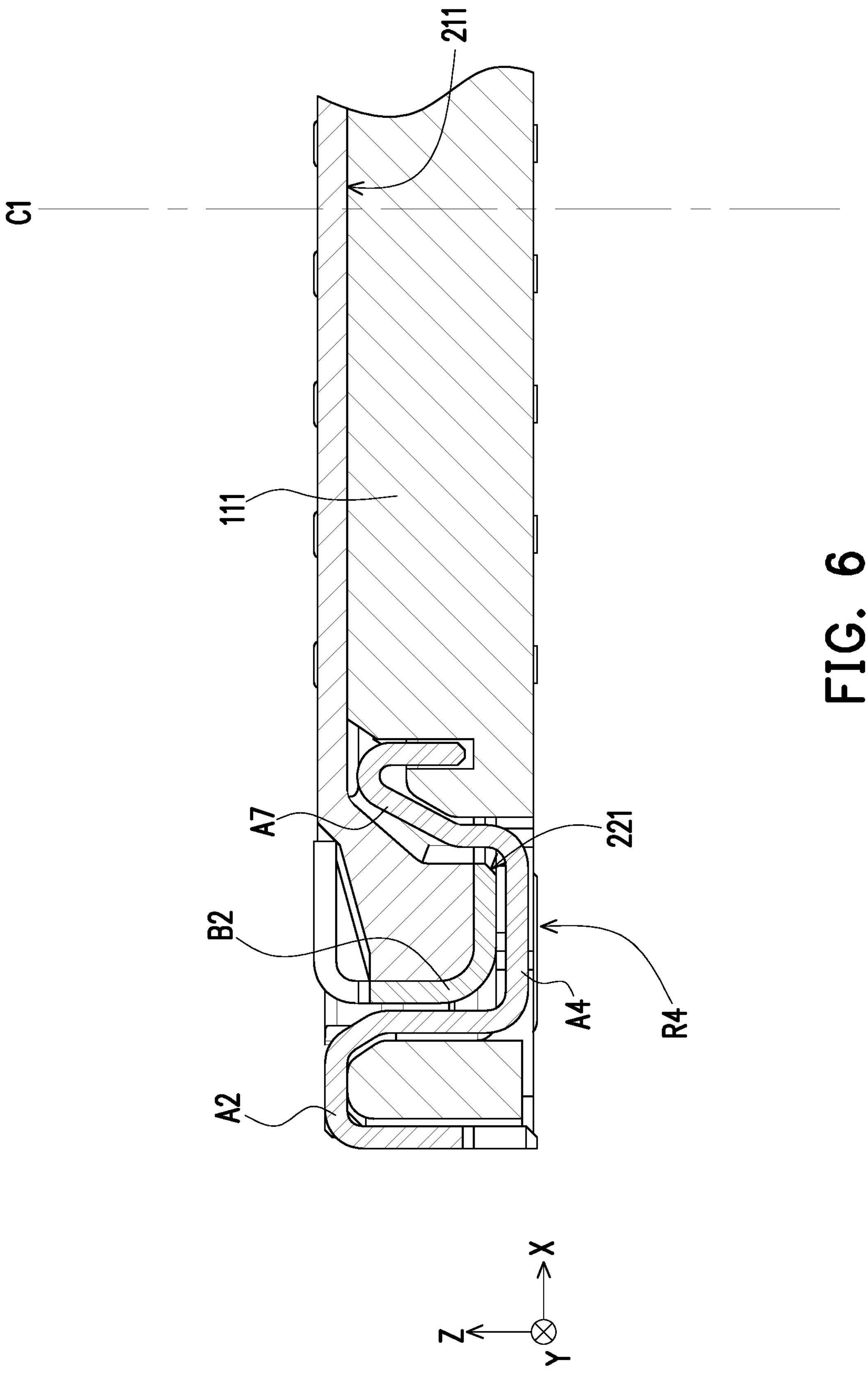
FIG. 6 and FIG. 7 are cross-sectional views of the board-to-board connector assembly of FIG. 1 from different perspectives, respectively.
Figure 7:
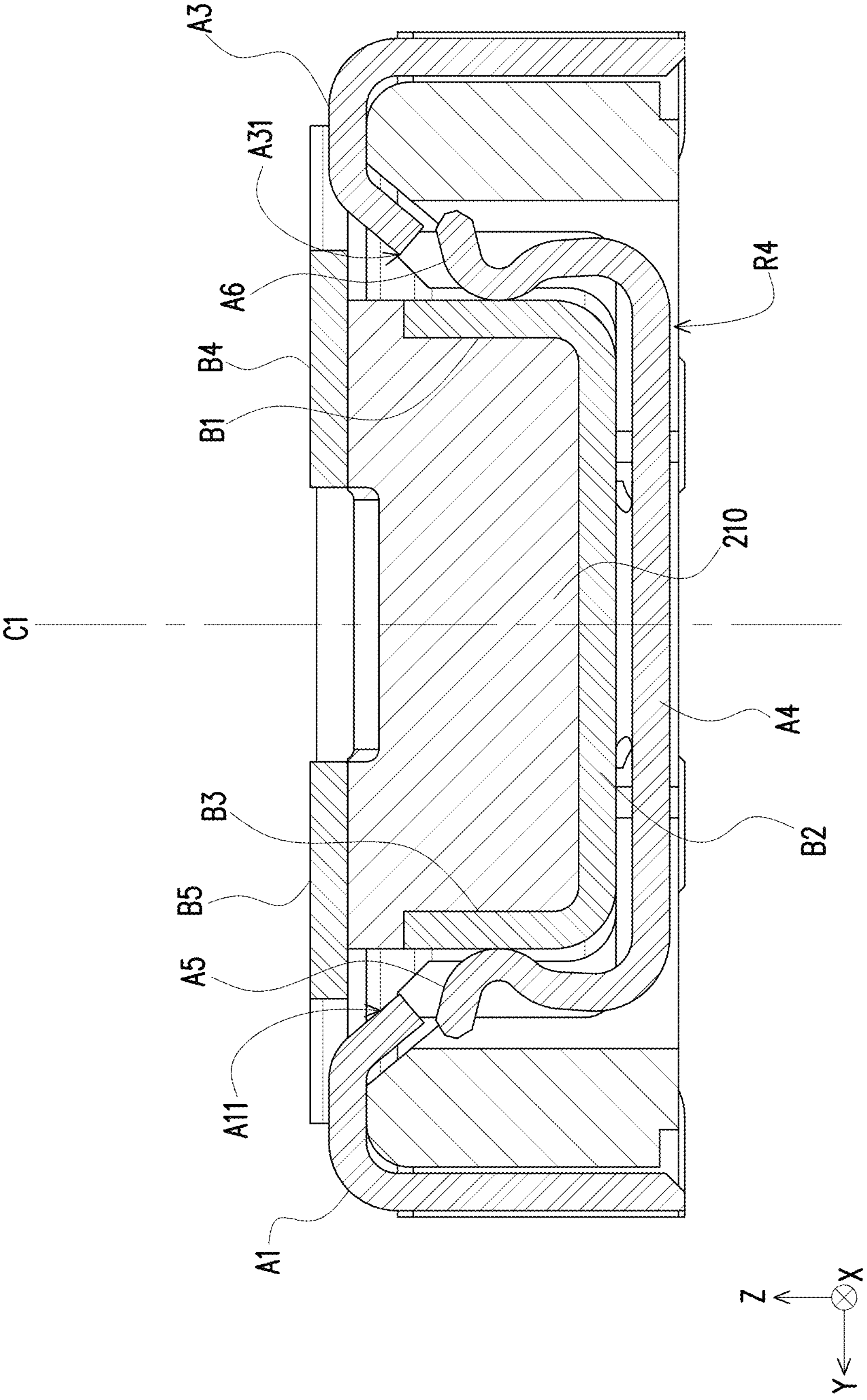

FIG. 5 is an exploded view of the plug connector of FIG. 2. FIG. 6 and FIG. 7 are cross-sectional views of the board-to-board connector assembly of FIG. 1 from different perspectives. Rectangular coordinates XYZ and a central axis C1 are provided to facilitate identification of the cross-sectional orientations of FIG. 6 and FIG. 7. Please refer to FIG. 2 and FIG. 5 first. In this embodiment, the plug connector 200 includes a second body 210, a plurality of second terminals 230 and a pair of second metal members 220, the material and combination of which are the same as the aforementioned first body 110, the first terminals 130 and the first metal members 120. The second body 210 has a second receiving slot 211. The second terminals 230 are respectively disposed on two opposite sides of the second body 210. The second metal members 220 are disposed on another two opposite sides of the second body 210. As shown in FIG. 2 and FIG. 7, when the plug connector 200 is mated with the receptacle connector 100, the second body 210 is inserted into the first receiving slot 112; the island structure 111 is inserted into the second receiving slot 211; and the first metal members 120 abut against the second metal members 220 through the first elastic arms A5 and A6.

In more detail, as shown in FIG. 5, the second metal members 220 includes L-shaped parts B1, B2 and B3 being adjacent to each other to form a U-shaped outline, and the L-shaped parts B1 to B3 respectively contact a top surface and a side face of the second body 210, so that the three L-shaped parts B1 to B3 partially surround the second body 210, and there is a gap between the two adjacent L-shaped parts B1 and B2 (or B2 and B3), so that corners of the second body 210 may be exposed, thereby providing the effect of structural limitation. Meanwhile, the middle L-shaped part B2 further forms two L-shaped parts B4 and B5 extending to the bottom surface of the second body 210, so that the second metal member 220 covers five different surfaces of the second body 210. Also like the aforementioned receptacle connector 100, the second metal members 220 and the second terminals 230 are formed integrally with the second body 220 by insert molding, and the bonding strength of the second metal members 220 and the second body 210 is improved by the aforementioned covering structures.

Please refer to FIG. 3, FIG. 5 and FIG. 6 again. In this embodiment, the first metal member 120 further includes a second elastic arm A7 extending from the base A4 to the island structure 111, and the second elastic arm A7 is located between the first elastic arms A5 and A6 facing away from each other. Furthermore, as shown in FIG. 5 and FIG. 6, the second metal member 220 further includes a slope 221, which is disposed along the three adjacent L-shaped parts B1 to B3, and there is an included angle relative to the plugging and unplugging direction of the connector, and the included angle is less than or equal to 45 degrees, so that when the plug connector 200 is mated with the receptacle connector 100, the slope 221 abuts and guides the second elastic arm A7 of the first metal member 120, so as to avoid damage to the terminals due to impact during the mating process.

Please refer to FIG. 3 and FIG. 7 again. The saddles A1 and A3 of the first metal member 120 of the embodiment (i.e., the first and last ones of the three saddles A1 to A3 adjacent to each other) have inward inclinations A11 and A31, and the pair of first elastic arms A5 and A6 face the inward inclinations A11 and A31, respectively. In this way, in addition to allowing the inward inclinations A11 and A31 to provide guidance for the plug connector 200 when the connectors are mated, the inward inclinations A11 and A31 may also be used to block the first elastic arms A5 and A6 along the plugging and unplugging axis (Z axis) of the plug connector 200 and the receptacle connector 100. It should be noted that the blocking does not necessarily occur, but when the plug connector 200 is pulled away from the receptacle connector 100 (along the positive Z-axis direction), if the first elastic arms A5 and A6 are deformed due to the excessive clamping force on the plug connector 200 and are pulled out together along the positive Z-axis direction, due to the existence of the inward inclinations A11 and A31, the aforementioned situation can be prevented.

To sum up, in the above-mentioned embodiments of the disclosure, the board-to-board connector assembly includes a plug connector and a receptacle connector that may mate with each other. The pair of first metal members of the receptacle connector, in addition to being combined to opposite sides of the first body, further include the base extending to the bottom of the receiving slot of the first body and the first elastic arms extending from the base and facing away from each other.

Accordingly, the first elastic arms and the first terminals may be disposed in two rows alike to serve as the power terminals of the receptacle connector, so that the first metal members with a larger area can be used to improve the bonding strength with the first body, and it can also be used as a basis for larger current transmission operations. Furthermore, in the corresponding plug connector, the second metal member has a slope corresponding to the first elastic arms, so as to serve as a guide when the connectors are mated. In addition, the receptacle connector further includes inward inclinations facing the first elastic arms. In addition to the same guiding effect as the aforementioned slope, when the plug connector is pulled away from the receptacle connector and the first elastic arms are unfortunately deformed and may be pulled out, the inward inclinations have the effect of blocking the first elastic arms.

In this way, the board-to-board connector assembly can carry out a larger current transmission operation with better structural stability and plugging and unplugging tolerance according to the above-mentioned simple structure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A board-to-board connector assembly, comprising:

a receptacle connector, comprising:

a first body, comprising an island structure and a first receiving slot surrounding the island structure;

a plurality of first terminals, respectively disposed on a first side and a second side of the first receiving slot, wherein the first side and the second side are opposite to each other; and a pair of first metal members, respectively disposed on a third side and a fourth side of the first receiving slot, wherein the third side and the fourth side are opposite to each other, wherein the first metal member comprises a base extending to a bottom on the third side or a bottom on the fourth side, and a pair of first elastic arms extending from the base and facing away from each other; and a plug connector, configured to be mated with the receptacle connector, wherein the plug connector has a pair of second metal members oppositely, each of the second metal members has three L-shaped parts adjacent to each other to form a U-shaped outline, and the three L-shaped parts form a structurally continuous slope along an inner edge of the U-shaped outline.

2. The board-to-board connector assembly according to claim 1, wherein the first elastic arms and a part of each of the first terminals are aligned collinearly.

3. The board-to-board connector assembly according to claim 1, wherein each of the first elastic arms is a power terminal of the receptacle connector.

4. The board-to-board connector assembly according to claim 1, wherein the first metal member comprises three saddles disposed on a periphery of the first body, the three saddles are adjacent to each other and disposed in a U shape, the saddle located in the middle extends out of the base, and each of the saddles contacts three different surfaces of the first body.

5. The board-to-board connector assembly according to claim 1, wherein the first metal member further comprises a second elastic arm extending from the base to the island structure, and the second elastic arm is located between the pair of first elastic arms.

6. The board-to-board connector assembly according to claim 1, wherein the first receiving slot is a through hole on the third side and the fourth side, and the base is exposed from a bottom surface of the first body through the through hole.

7. The board-to-board connector assembly according to claim 1, wherein the plug connector comprises:

a second body, comprising a second receiving slot;

a plurality of second terminals, respectively disposed on two opposite sides of the second body; and the pair of second metal members, disposed on another two opposite sides of the second body, wherein when the plug connector is mated with the receptacle connector, the second body is inserted into the first receiving slot, the island structure is inserted into the second receiving slot, and the pair of first metal members abuts the pair of second metal members through each of the first elastic arms.

8. The board-to-board connector assembly according to claim 7, wherein the second metal members cover five different exterior surfaces of the second body, including upper and lower surfaces of the second body.

9. The board-to-board connector assembly according to claim 7, wherein when the plug connector is mated with the receptacle connector, the structurally continuous slope abuts and guides a second elastic arm of the first metal member.

10. The board-to-board connector assembly according to claim 1, wherein the first metal member comprises three saddles disposed on a periphery of the first body, the three saddles are adjacent to each other and disposed in a U shape, and the pair of first elastic arms respectively face an inward inclination of each of the saddles located at the first and last positions, wherein an orthogonal projection of the inward inclination on a plane where the base of the first metal member is located on partially overlaps an orthogonal projection of the first elastic arm on the plane.

11. A receptacle connector, comprising:

a first body, comprising an island structure and a first receiving slot surrounding the island structure;

a plurality of first terminals, respectively disposed on a first side and a second side of the first receiving slot, wherein the first side and the second side are opposite to each other; and a pair of first metal members, respectively disposed on a third side and a fourth side of the first receiving slot, wherein the third side and the fourth side are opposite to each other, wherein the first metal member comprises a base extending to a bottom on the third side or a bottom on the fourth side, and a pair of first elastic arms extending from the base and facing away from each other, wherein the first metal member comprises three saddles disposed on a periphery of the first body, the three saddles are adjacent to each other and disposed in a U shape, each of the first metal members has a pair of protruding pieces respectively located between a corner of the U shape and one of the first elastic arms, extending from the saddles at a first position and at a last position toward the first receiving slot, and abutting against an inner wall of the first receiving slot.

12. The receptacle connector according to claim 11, wherein the first elastic arms and a part of each of the first terminals are aligned collinearly.

13. The receptacle connector according to claim 11, wherein each of the first elastic arms is a power terminal of the receptacle connector.

14. The receptacle connector according to claim 11, wherein the first metal member comprises three saddles disposed on a periphery of the first body, the three saddles are adjacent to each other and disposed in a U shape, the saddle located in the middle extends out of the base, and each of the saddles contacts three different surfaces of the first body.

15. The receptacle connector according to claim 11, wherein the first metal member further comprises a second elastic arm extending from the base to the island structure, and the second elastic arm is located between the pair of first elastic arms.

16. The receptacle connector according to claim 11, wherein the first receiving slot is a through hole on the third side and the fourth side, and the base is exposed from a bottom surface of the first body through the through hole.

17. The board-to-board connector assembly according to claim 11, wherein the pair of first elastic arms respectively face an inward inclination of each of the saddles located at the first and last positions, wherein an orthogonal projection of the inward inclination on a plane where the base of the first metal member is located on partially overlaps an orthogonal projection of the first elastic arm on the plane.

18. A board-to-board connector assembly, comprising:

a receptacle connector, comprising:

a first body, comprising an island structure and a first receiving slot surrounding the island structure;

a plurality of first terminals, respectively disposed on a first side and a second side of the first receiving slot, wherein the first side and the second side are opposite to each other; and a pair of first metal members, respectively disposed on a third side and a fourth side of the first receiving slot, wherein the third side and the fourth side are opposite to each other, wherein the first metal member comprises a base extending to a bottom on the third side or a bottom on the fourth side, and a pair of first elastic arms extending from the base and facing away from each other; and a plug connector, configured to be mated with the receptacle connector, wherein the plug connector comprises:

a second body, comprising a second receiving slot;

a plurality of second terminals, respectively disposed on two opposite sides of the second body; and a pair of second metal members, disposed on another two opposite sides of the second body, wherein when the plug connector is mated with the receptacle connector, the second body is inserted into the first receiving slot, the island structure is inserted into the second receiving slot, and the pair of first metal members abuts the pair of second metal members through each of the first elastic arms, wherein the second metal member has three L-shaped parts adjacent to each other to form a U-shaped outline covering side surfaces and a top surface of the second body, wherein the second metal member has another two L-shaped parts extending from a middle one of the three L-shaped parts, and the another two L-shaped parts extend to and cover a bottom surface of the second body, wherein adjacent two of the three L-shaped parts are structurally integrated at a top surface of the second body and separated at a side of the second body to expose a corner of the second body to structurally constrain the second metal member and the second body together.

* * * * *